United States Patent [19]
Nieweg

[11] Patent Number: 5,238,559
[45] Date of Patent: Aug. 24, 1993

[54] FILTER DEVICE

[76] Inventor: Heinrich Nieweg, Am Froelenberg 21, 4800 Bielefeld 14, Fed. Rep. of Germany

[21] Appl. No.: 840,489

[22] Filed: Feb. 24, 1992

[30] Foreign Application Priority Data

Mar. 14, 1991 [DE] Fed. Rep. of Germany ....... 9103073

[51] Int. Cl.⁵ ................... B01D 27/08; B01D 29/085
[52] U.S. Cl. ................... 210/264; 210/416.3;
210/467; 220/372; 222/189; 222/481
[58] Field of Search ........... 210/263, 264, 282, 416.3,
210/464, 466, 467, 469, 475; 215/31, 308, 309;
220/371, 372; 222/189, 481

[56] References Cited

U.S. PATENT DOCUMENTS

| | | |
|---|---|---|
| 690,457 | 1/1902 | Parker . |
| 1,019,171 | 3/1912 | Melville . |
| 2,372,340 | 3/1945 | Senyal . |
| 2,781,312 | 2/1957 | Klumb et al. . |
| 3,335,917 | 8/1967 | Knight . |
| 3,840,153 | 10/1974 | Deulin ................. 222/146 |
| 4,024,991 | 5/1977 | Tyson et al. .......... 222/189 |
| 4,044,923 | 8/1977 | Gardner ............... 222/190 |
| 4,938,389 | 7/1990 | Rossi et al. ........... 222/189 |

Primary Examiner—Robert A. Dawson
Assistant Examiner—W. L. Millard
Attorney, Agent, or Firm—Browdy and Neimark

[57] ABSTRACT

A filter device has a filter container closed on all sides, into the bottom of which a cartridge-shaped filter insert has been inserted, under which a filtrate catch reservoir is disposed. An air supply tube is inserted into the filter container which terminates on the inside in an air compensation hole at an adjustable height above the inlet of the filter insert, so that the corresponding hydrostatic pressure of the liquid determines the flow-through speed of the filtrate. The air supply tube terminates at the bottom above the filtrate outlet of the filter insert, so that a filtrate build-up terminates on the corresponding level and the filter insert is closed airtight in this way.

15 Claims, 2 Drawing Sheets

FILTER DEVICE

FIELD OF INVENTION

The present invention relates to a filter device with a closed filter container for a liquid to be filtered, on the bottom of which a filter insert is disposed and in the bottom of which an air compensation hole is provided.

BACKGROUND

Application for the grant of a patent on this type of device has been filed under U.S. Ser. No. 638,354. There, a canister-like water reservoir is provided with two adjoining threaded connections, one of which is used for receiving a cartridge-shaped flow-through filter insert and the other, usually kept closed, is for refilling with water. In actual use the filter container with the filter insert facing downwardly is disposed on top of a catch reservoir which may have a spout on the side from where the filtrate can be removed.

An air compensation hole is located at the seal of the threads of the filter insert or below or next to the filter, which allows for the flow of air into the container as soon as the pressure in the container has been sufficiently reduced by the outflow of filtrate. In this disposition of the air compensation hole at a middle height in relation to the filter or lower than the latter, the hydrostatic pressure which decisively determines the flow through the filter is low. This may cause stoppage of the flow through the filter, so that filtrate no longer emerges.

Measurements have shown that the hydrostatic pressure at the level of the air compensation hole fluctuates slightly around the value of the ambient air pressure. Sometimes blockage of the filter results in air entering the filter, and this in turn can result in oxidation and/or contamination by microbes of the filter material. Because of the balanced hydrostatic pressure, practically no pressure acts on the filter, so that its flow resistance can hardly be overcome. Thus a slight flow through the filter mainly occurs on account of the capillary suction effect of the gaps in the filter material, the width of which is strongly dependent on the respective arrangement and type of the material filled into the filter. Since many types of different filters are commercially available, the respective filter determines how quickly the filtrate emerges; no action which might make possible an adaptation to different types of material t be filtered and different degrees of soiling is provided.

SUMMARY OF THE INVENTION

It is an object of the invention to provide a filter container from which the filtrate emerges at a predetermined flow rate and where stoppage of the flow through the filter does not occur. This object is achieved by locating the air compensation hole at the end of an air supply tube at a height, which can be pre-determined, above the filter insert.

The air compensation hole is not only located above the outlet opening of the filtrate, but also above the filter inlet. The height of the air compensation hole above the filter determines the hydrostatic pressure above the filter, which together with the filter resistance essentially determines the flow-through rate.

The size of the air compensation hole is chosen to be such that, although air passes through in accordance with the amount of filtrate flowing through the filter, no liquid directly flows through the hole. However, the air supply tube is brought out of the reservoir low enough towards the bottom that a filtrate level can build up in a catch reservoir below the filter maximally only as high as this tube end and in this way the overflow of the filtrate out of the catch reservoir is prevented in a simple manner.

As long as the liquid level in the filter container lies above the air compensation hole, a constant hydrostatic pressure exists above the filter, which pressure is independent of the fill level in the container; because of this construction, flow through the filter is even and can be set by merely adjusting the height of the air compensation hole. The filter is freely ventilated only when the fill level in the container has fallen below the air compensation hole, which causes pressure and flow conditions which are known from gravity-driven filters.

The hydrostatic pressure and thus the flow can be optimally adapted to diverse types of filters and intended uses by means of an adjustment of the height of the air compensation hole. The air supply tube is thus displaceably disposed in its seal for this purpose. The setting of an optimal amount of flow is primarily determined by adjusting the height of the air compensation hole above the filter inlet, together with the flow resistance of the filter; in contrast thereto, the shape and diameter of the air compensation hole and of the air supply tube only have subordinate importance.

In an advantageous manner, a level limit below the filter container is furthermore the result of the adjustability of the lower air supply tube opening to a predetermined level. In this way the air supply tube has a dual function because of its adjustability. The setting of the maximum liquid level below the filter container is determined by the position of the lower tube opening; in a practical manner this is set to a middle height in the area of the filter, so that the filter is not emptied and thus does not oxidize or become contaminated by micro-organisms.

The amount of liquid flowing off unfiltered through the air compensation hole is reduced to an extremely small amount by the shaping of the air compensation hole. An embodiment of the air compensation hole having a defined break-off edge between the areas of air and liquid has proven to be most particularly advantageous. By means of this defined break-off edge the spread of the liquid in the air supply tube in the form of a capillary flow is prevented. Because of this action it is assured that at most only a very small amount of liquid emerges when inverting the filter at the start of the filtering operation, i.e. after renewed filling with liquid. The sharp break-off edge of the air compensation hole is provided, for example, by the transition of a large cross section of the air supply tube into an opening of lesser cross section at the interface between the air and liquid. No capillary flow can occur in the air supply tube.

Additionally, the lower end of the air supply tube terminates obliquely, at approximately 45°, because of which water that has entered the tube immediately drips off and does not cause a build-up. The upper end of the air supply tube at the liquid level, on the other hand, may be bent horizontally, truncated or conically tapered with a centered opening.

In the filtering position of the container the air supply tube is inserted from below, for which a flexible seal is provided which assures a displacement possibility in height.

It is also possible to insert the air supply tube from the side or the top into a correspondingly constructed filter container which, however, generally results in an essentially longer tube or hose if the other pipe end is intended to be used as an inlet limitation in a filtrate catch reservoir. In this case the air supply tube is preferably extended by means of a hose as far as the maximally intended level of the filtrate, or it is composed of two tube sections connected by means of a seal and displaceable within each other, so that the height of its upper opening and the position of its lower opening can be set independently of one another. Insertion of the air supply tube from the top has the advantage that basically no unfiltered liquid flows through.

BRIEF DESCRIPTION OF DRAWING

The following detailed description of advantageous embodiments, illustrated in FIGS. 1 to 6, will further explain other objects and the nature and advantages of the present invention.

DETAILED DESCRIPTION OF EMBODIMENTS

Figure 1:
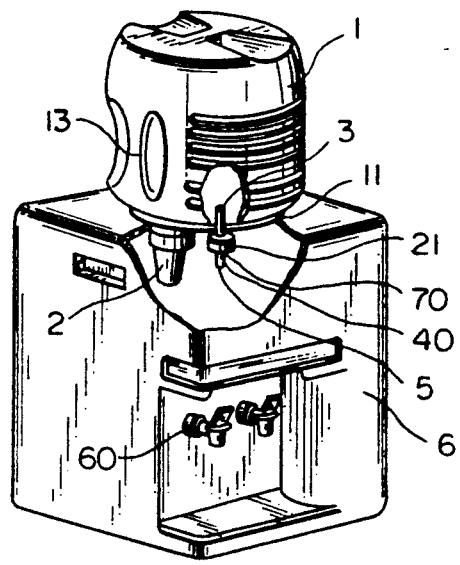
FIG. 1 shows a partially opened filter device.

FIG. 1 shows a filter device with an upper filter container (1) for an unfiltered liquid, in particular water, and a filter insert (2) at the bottom, the lower outlet side of which is disposed over a catch reservoir (6) for the filtrate. In the embodiment here illustrated, the filter container (1) is laterally set directly on the catch reservoir (6), so that the filter insert (2) extends from above into the catch reservoir (6). The lateral engagement of the filter container (1) is sealed to a large extent, to prevent contamination of the filtrate. The stored filtrate can be removed at the bottom of the catch reservoir (6) through a spout (60). A refill neck (11) is disposed on the filter container (1) next to the filter insert (2), and the filter reservoir (1) has a handle (13) on the side for convenient manipulation during refilling. An air supply tube (40) is inserted within a through-flow seal (70), which may be housed in a threaded closure cap (21), onto the threaded refill neck (11), and the tube (40) terminates inside at a height above the upper filter inlet in a small air compensation hole (3). The lower tube end (5) of the air supply tube (40) terminates approximately at half the height of the cartridge-shaped filter insert (2). It is cut off at an angle, so that liquid drips off and cannot cause a build-up.

Figure 2:
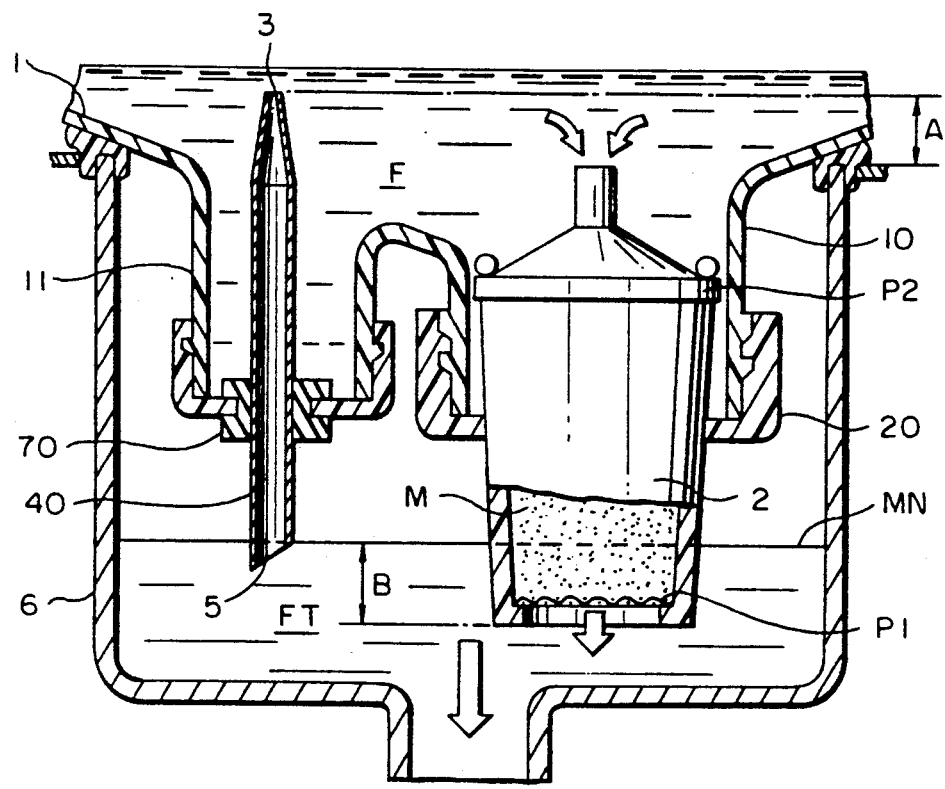
FIG. 2 shows a section of the filter area of a filter container.

FIG. 2 shows an enlarged detail of the filter arrangement. The cartridge-shaped filter insert (2) is inserted into a filter neck (10), sealed off by means of a filter screw connection (20) of the filter container (1). Next to it is the refill neck (11) with the air supply tube (40), which is maintained axially displaceable in the through-flow seal (70) formed of flexible plastic or rubber. The upper tube end extending into the filter container tapers conically and terminates in the small air compensation hole (3). The lower tube end (5) extends into the catch reservoir (6); however, it terminates at a level (MN) above the lower filtrate outlet of the filter insert (2) at a vertical distance (B) of a few centimeters, so that the filtrate (FT) level backs up at most as far as this level (MN). By means of this arrangement it is assured that the filter (2) is always filled with liquid when the filter operation is interrupted by a build-up of the filtrate (FT) as far as the level (MN).

The upper end of the air supply tube (40), i.e. the air compensation hole (3), is disposed at a distance (A) of a few centimeters above the upper inlet of the filter insert (2). In this way it is assured that a hydrostatic pressure corresponding to the height (A) presses the liquid (F) to be filtered against the filter resistance through the filter insert (2). The filter insert (2) is constructed in a known manner in such a way that a fine-grained absorption material (M) and/or ion exchange material is contained between screen-like end plates (P1, P2), between which liquid is temporarily kept in the capillary chambers during flow-through filtration and the cleaning process. The respective shape of these capillary chambers determines the filter resistance. If no hydrostatic pressure pushes the liquid through the filter, the capillary force detains it to a large degree and only partial areas of the filter are filled with air.

The conical construction of the upper end of the air supply tube (40) prevents the entry of liquid (F) into this tube.

Figure 3:
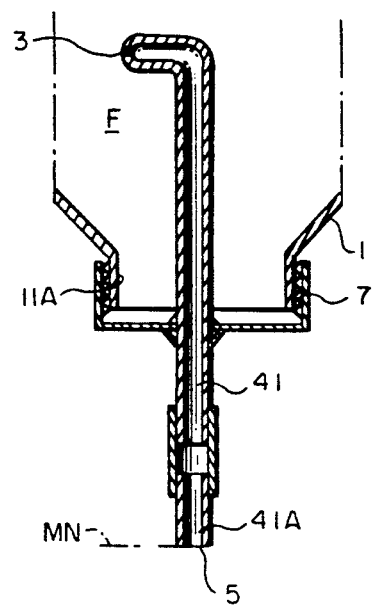
FIGS. 3 to 5 show different air supply tubes.

FIG. 3 illustrates a different bottom embodiment and disposition of the air supply tube (41) in a filter container (1). The air supply tube (41) is here inserted in the neck (11A) of this container (1) with an annular sealing muff (7) and is tightly and securely maintained in this sealing muff (7). The entire elastic sealing muff (7) is maintained axially displaceable on the vertical neck (11A) for adjusting the position in height of the air compensation hole (3). The upper end of the air supply tube (41) has been laterally bent by approximately 90° and extends with its front as far as the air compensation hole (3). This construction also prevents to a large degree the flow-through of liquid. To make possible the setting of the maximum filtrate level (MN) independently of the flow-through speed, the lower tube end (5) is disposed at a separate tube section (41A), which is slideably connected with the upper air supply tube (41) and in this way is vertically displaceable in respect to the upper tube (41).

Figure 4:
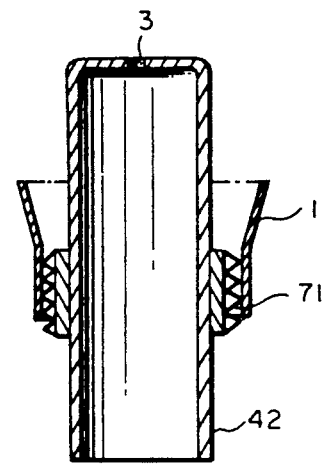

FIG. 4 shows a further embodiment of an air supply tube (42). This one has a fixed, annular muff (71), which is placed via a flexible seal on the refill neck (11) and is displaceably maintained there. The air compensation hole (3) is disposed centered in a blunt end of the air supply tube (42).

Figure 5:
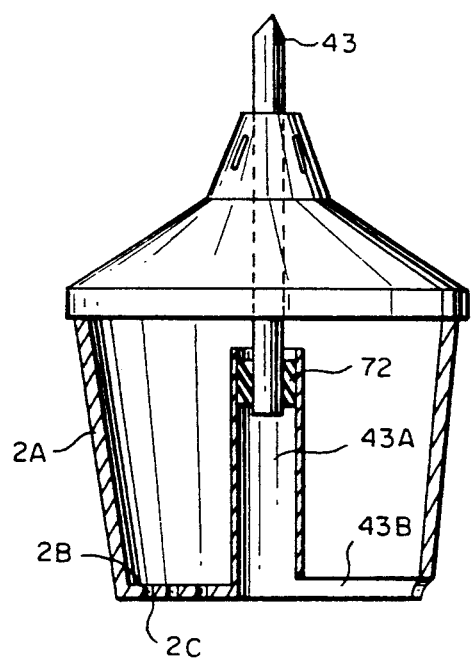

FIG. 5 shows a vertical cross section of a filter insert (2A) through which the air supply tube (43) extends and in which it is displaceably maintained in a flexible seal (72). The displaceable air supply tube (43) terminates in a filter insert (2A) in an air supply conduit (43A) extending from the bottom to approximately the center and which constitutes an extension of the air supply tube (43). A horizontal air supply conduit section (43B), located above the filtrate outlet openings (2C), horizontally extends from this centered air supply conduit (43A) at the lower filter bottom (2b), so that the filtrate can build up as far as the upper side of the conduit section (43B), while the filter area is closed off against the entry of air.

Figure 6:
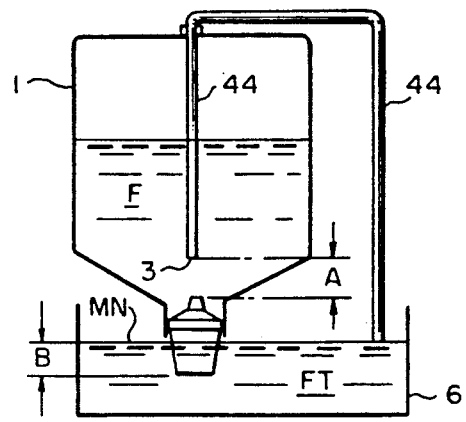
FIG. 6 shows a filter container with an upper air supply tube.

FIG. 6 schematically shows an air supply tube (44) extending from the top into the filter container (1). The air supply tube (44) is guided through an upper wall of the filter container (1) to the outside and into the catch reservoir (6) of the filtrate (FT) and terminates there at the desired maximum filterate level (MN) which lies above the filtrate outlet by the height (B). In this case the air compensation hole (3) can be selectively placed because it is located at a distance (A) above the filter inlet and the liquid (F) does not rise in the air supply tube.

The foregoing description of the specific embodiments reveal the general nature of the invention so that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. In a filter device comprising a closed filter container (1) for a liquid (F) to be filtered, on the bottom of which a filter insert (2) is disposed extending downwardly and having an air compensation hole (3) inside said container (1), the improvement wherein the air compensation hole (3) is located at a pre-determined height (A) of a few centimeters above the filter insert (2) at an end of an air supply tube (40–44).

2. A filter device in accordance with claim 1, wherein the air supply tube (40) is maintained height-adjustably in a flexible seal (7, 70) in a wall of the filter container (1).

3. A filter device in accordance with claim 1, wherein the air supply tube (40) is maintained height-adjustable in a flexible through-flow seal (70) inserted in a closure cap (21) of a refill neck (11) of the filter container (1).

4. A filter device in accordance with claim 3, wherein the refill neck (11) is disposed next to the filter insert (2) on the filter container (1).

5. A filter device in accordance with claim 1, wherein the air compensation hole (3) has an interior cross-section narrower than an interior cross section of the air supply tube (40–43).

6. A filter device in accordance with claim 5, wherein the interior cross section of the air supply tube (43) tapers to become smaller towards the air compensation hole (3).

7. A filter device in accordance with claim 1, wherein the air supply tube (40–44) has a lower tube end (5) located opposite the air compensation hole (3) which terminates below the filter container (1) and above a lower bottom of the filter insert (2).

8. A filter device in accordance with claim 7, wherein the lower tube end (5) is located at a lower tube-section (41A) of the air supply tube (41) which is vertically displaceable with respect to an upper tube section.

9. A filter device in accordance with claim 1, wherein the air supply tube (44) is sealingly guided through an upper wall of the filter container (1).

10. A filter device in accordance with claim 1, wherein the air supply tube (43) is disposed in the filter insert (2) and inserted together with said filter insert in the filter container (1).

11. A filter device in accordance with claim 10, wherein the air supply tube (43) downwardly extends into an air supply conduit (43A) which transitions into a laterally directed air supply conduit (43B) extending towards the exterior above a filtrate outlet opening (2C) of the filter insert (2).

12. In a filter device comprising a closed filter container for a liquid to be filtered, said container having a bottom portion in the form of a narrowed neck adapted to receive a filter insert therein, and a filter insert having an upper inlet end disposed in said narrowed neck bottom portion and extending downwardly therefrom and an outlet opening at a bottom end thereof, said filter insert having an inlet opening at said upper end thereof for receiving liquid into said filter from the bottom portion of said container, and an air compensation hole, the improvement wherein the air compensation hole is located at a pre-determined height slightly above the upper end of said filter insert and at an end of an air supply tube.

13. A filter device according to claim 12 wherein said air supply tube has a bottom opening disposed at a level higher than the outlet opening of said filter insert.

14. A filter device according to claim 13 wherein said air supply tube has a large cross-sectional area compared to said air composition hole.

15. A filter device according to claim 14 wherein said bottom opening of said air supply tube extends obliquely.

* * * * *